United States Patent Office

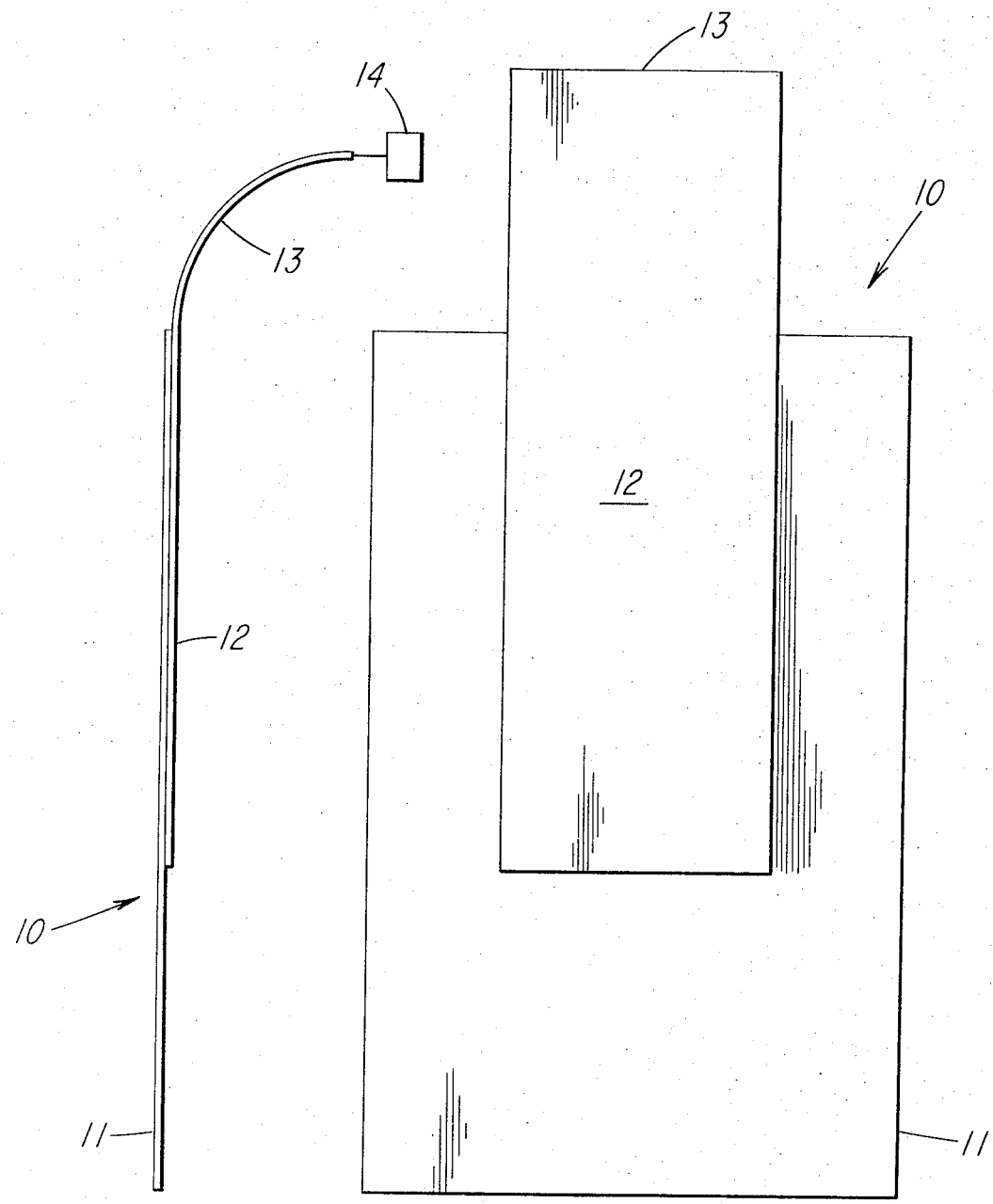

3,842,133
Patented Oct. 15, 1974

3,842,133
METHOD FOR MAKING A POLYMERIC FUSION ADHESIVE PRACTICALLY FREE OF ORGANIC SOLVENTS AND WHICH IS MELTABLE AND SOLUBLE IN ORGANIC SOLVENTS
Horst Dalibor, Harksheide, Richard Gutte, Oststeinbek, and Gunter Stenzel, Hamburg, Germany, assignors to Reichhold-Albert-Chemie Aktiengesellschaft, Hamburg, Germany
Continuation-in-part of abandoned application Ser. No. 95,796, Dec. 7, 1970. This application Jan. 16, 1973, Ser. No. 324,181
Claims priority, application Switzerland, Dec. 8, 1969, 516,607/69
Int. Cl. C08f *1/00, 15/40, 27/18*
U.S. Cl. 260—80.73                8 Claims

ABSTRACT OF THE DISCLOSURE

The present invention concerns a method of producing copolymers soluble in organic solvents, which are used as fusion adhesives and fusion contact adhesives, characterized in that
(a) a nitrile of an $\alpha,\beta$-ethylenically unsaturated mono- or dicarboxylic acid or a mixture of more than one such nitrile,
(b) an amide of an $\alpha,\beta$-ethylenically unsaturated mono- or dicarboxylic acid or a mixture of more than one such amide,
(c) an ester of acrylic acid or methacrylic acid, containing 4 to 12 carbon atoms in the alcohol residue, or a mixture of more than one such ester, and
(d) methyl methacrylate are copolymerized. A preferred embodiment is characterized in that said copolymer is made to react with 0.01 to 0.5% by weight of formaldehyde or formaldehyde - donating compounds, while being heated.

Cross-Reference to Related Applications

This is a continuation-in-part application of application Ser. No. 95,796 filed on Dec. 7, 1970 in the U.S. Patent Office, now abandoned. Applicants claim priority of application Ser. No. 516,607/69 filed on Dec. 8, 1969 in the Swiss Patent Office.

BACKGROUND OF THE INVENTION

1. Field of the invention

Copolymers soluble in organic solvents have been used earlier as adhesives and contact adhesives respectively in the form of watery dispersions and also in the form of copolymers dissolved in organic solvents.

The application of watery dispersions, which contain copolymers soluble in organic solvents show a great disadvantage because of the necessity of applying also relatively large amounts of water. Therefore the technological use is limited or at least the technological work is aggravated. Similar difficulties exist when copolymers dissolved in organic solvents are used for the same purpose.

There are also fusion adhesives known on the basis of copolymers. These well-known fusion adhesives have the great disadvantage of showing no glutinous surface at room temperature. This means that the known fusion adhesives have to be heated during cementing in order to obtain a usable adhesion. It is a further task of this invention to make such fusion adhesives and fusion contact adhesives available that will show surfaces, after application in the molten state, like a coating that has a viscid surface preferably in the temperature region of 0° C. to 50° C., preferably at an ambient temperature of 20° C. The most preferred embodiment comprises the cementing at room temperature of about 20° C.

It is the function of the present invention to make available a method for the production of copolymers soluble in organic solvents which produces such copolymers that will directly find application as fusion adhesives and fusion contact adhesives respectively without the need for solvents and dispersion agents.

By using copolymers produced by the present invention as fusion adhesives or fusion contact adhesives one will attain considerable commercial savings because of omission of evaporation of solvents and of dispersion agents.

Moreover, much greater processing speeds will be obtained because of omission of evaporation of solvents and of dispersion agents when using copolymers as fusion adhesives and fusion contact adhesives on an industrial scale.

2. Prior Art

U.S. Pat. 3,362,844 to Christenson et al. claims a metal article having a hard, adherent, crack-resistant, multiple-layer coating comprising a layer of primer and a superimposed layer of a thermoplastic methyl methacrylate lacquer in adherent contact therewith.

Christenson et al. recognize the problem of poor adhesion to metal surfaces when coatings are prepared with methyl methacrylate as a major constituent. See, for example, column 1, lines 62–64; column 2, lines 7–10; and column 2, lines 42–45. In order to solve the adhesion problem, they resort to a multiple layer system. In contradistinction thereto, the present invention provides a copolymer containing substantial amounts of methyl methacrylate, yet, unexpectedly, exhibiting excellent adhesive properties, as can readily be seen from the Examples of the present specification.

The further reaction with an aldehyde is only an additional embodiment of this invention.

In column 3, lines 38–41, Christenson et al. teach that at least 50 percent of the alkylol groups have to be etherified or the composition is unstable.

They also employ 2 to 7 percent of an amide and 2 to 10 percent of an unsaturated free acid, as well as other monomers.

In column 4, lines 59–64, they disclose that the polymerization initiators are heated together with the monomer. This represents a substantial difference in technique to one skilled in the polymerization art to the present process in which the dissolved monomer mixture is first heated to a temperature of 100° to 140° C. and only then the polymerization initiators are added.

Comparison Text 1 of the present specification shows the advance over Christenson et al.

U.S. Pat. 3,366,605 to Seiner claims a method for producing an amide interpolymer from a mixture of monomers using hydrogen peroxide as a catalyst and states that the presence of acrylonitrile or an alkyl acrylate as a comonomer with an unsaturated amide results in a reaction that is difficult to control. See, for example, Column 1, lines 43–50; column 4, lines 35–38 and lines 45–50. Yet, by practicing the process of the present invention no such difficulties are encountered. Moreover, the presently claimed process parameters and the specific limitations set forth in the present claims are neither shown nor suggested by Seiner.

Comparison Test 2 of the present specification shows the advance over Seiner.

The purpose of Applicants' invention is completely different from the purpose disclosed in either Seiner or Christenson et al. Applicants are making a polymeric fusion adhesive useful for bonding solid surfaces together. This adhesive need not be glossy or have properties pertinent to paints, primers or coating compositions, which is what each of the Seiner and Christenson et al. patents are concerned with. Those coatings are applied as a liquid, like paints, and then dried; but thereafter those coatings are intended as finishes, and not as adhesives to which to bond another solid surface.

The object of the present invention is to provide a product having adhesive properties and to provide a process for producing such a product. Applicants' product is more than twice as tacky as the coating composition prepared by Seiner or Christenson et al.

SUMMARY OF THE INVENTION

Subject of the invention is a method for making a polymeric fusion adhesive which is soluble in organic solvents, which comprises (1) heating a mixture of (a) 1 to 20% by weight of acrylonitrile, methyacrylonitrile, maleic dinitrile, fumaric dinitrile, mononitriles of maleic acid monoesters, mononitriles of fumaric acid monoesters, or a mixture of more than one such nitrile, the alcohol residue of said monoesters contain 1 to 18 carbon atoms;

(b) 1 to 20% by weight of acrylamide, methacrylamide, maleic acid diamide, fumaric acid diamide or monoamides of maleic acid monoesters, monoamides of fumaric acid monoesters, or a mixture of more than one such amide, the alcohol residues of said monoesters contain 1 to 18 carbon atoms;

(c) 40 to 97% by weight of n-butyl acrylate, n-hexyl acrylate, 2-ethylhexylacrylate, n-decyl acrylate, n-dodecylacrylate, n-butyl methacrylate, n-hexyl methacrylate, 2-ethyl hexylmethacrylate, n-decylmethacrylate, n-dodecylmethacrylate, or a mixture of more than one such ester; and (d) 1 to 30% by weight of methyl methacrylate in an organic solvent to a temperature of about 100° C. to 140° C.;

(2) adding a polymerization initiator to said heated mixture, and (3) removing organic solvent from said mixture after samples of the resulting polymeric mixture indicate that the polymer has the viscosity of 100 to 600 DIN 6 seconds measured at 20° C. as 50% strength by weight in xylene solution.

In a special performance of the procedure the copolymer is made to react with 0.01 to 0.5% by weight of formaldehyde or formaldehyde-releasing agents while being heated.

In regard to the synthesis components the following is to be stated:

(a) the nitrile of an α,β-ethylenically unsaturated mono- or dicarboxylic acid, or mixture of such nitriles, may comprise: acrylonitrile, methyacrylonitrile, maleic dinitrile or fumaric dinitrile or mononitriles of maleic acid or fumaric acid monoesters, when the alcohol residue in the monoester contains 1 to 18 carbon atoms.

(b) The amide of an α,β-ethylenically unsaturated mono- or dicarboxylic acid, or mixture of such amides, may comprise: acrylamide, methacrylamide, maleic acid diamide or fumaric acid diamide or monoamides of maleic acid or fumaric acid diamide or monoamides of maleic acid or fumaric acid monoesters, when the alcohol residue in the monoester contains 1 to 18 carbon atoms.

(c) The ester of an α,β-ethylenically unsaturated mono- or dicarboxylic acid, or mixture of such esters, may comprise: n-butyl acrylate, hexyl acrylate, 2-ethyl hexylacrylate, decyl acrylate and dodecylacrylate or n-butyl methacrylate, hexyl methacrylate, 2-ethyl hexylmethacrylate, decylmethacrylate and dodecylmethacrylate. n-Butyl acrylate and 2-ethyl hexylacrylate are found to be particularly advantageous.

Suitable formaldehyde-donating compounds are paraformaldehyde, hexamethylenetetramine, trioxane, and gaseous formaldehyde dissolved in any one of many different media. The various media may be for instance plasticizers, vegetable or mineral oils, synthesis resins or natural resins.

It is also possible to use formaldehyde-releasing aminoplastes or phenol-formaldehyde resoles. Further possibilities are organic compounds or synthetic resins containing methylol ether groups that are masked or have been etherified with alcohols. The favoured compound used in hexamethylenetetramine.

The copolymers to be made in accordance with the invention are obtained by copolymerization of the α,β-ethylenically unsaturated compounds in accordance with the ordinary methods of manufacture, such as solvent polymerization or bulk or graft polymerization in the presence of the usual polymerization initiators and with the use of chain regulators also if required.

The optimum results are obtained by copolymerizing so that monomers of α,β-ethylenically unsaturated compounds are dissolved in solvents, and then at temperatures of 100 to 140° C., preferably at 110 to 120° C., the polymerization initiators are added to the heated solution, and at the favoured temperature the polymerization will be finished. After finishing polymerization the solvents such as xylene or butanol and toluene are the removed by distillation.

Suitable polymerization initiators are peroxides such as benzoyl peroxide, di-tertiary butyl peroxide, lauryl peroxide or cumene hydroperoxide.

The copolymers should have a viscosity of 50 to 1000 and preferably 100 to 600 DIN 6 seconds when measured as a 50% by weight xylene solution at 20° C.

In a special embodiment the copolymers used in accordance with the invention also contain added formaldehyde or formaldehyde-releasing compounds, and a reaction takes place after the addition. Presumably the formaldehyde reacts with the amide in the polymer.

The copolymers produced according to the invention and containing amide groups are well dissolved or dispersed together with formaldehyde or formaldehyde-donating substances in a suitable stirring unit such as a kneader or mixer, at room temperature and higher temperatures up to 200° C.

The best mixing effect is obtained if paraformaldehyde is added at 100° C. to 120° C. while the material is being stirred, and the mixture is then heated to 180° C. or even higher temperatures up to 220° C. in a time not exceeding one hour. This causes an increase in the viscosity, but storability for a time of about 12 to 48 hours at 180° C. to 220° C. is ensured by suitable selection of the quantity of formaldehyde and/or formaldehyde-releasing agents that are added. When the initial viscosity of the copolymer is higher, for instance about 500 to 1000 DIN 6 seconds when measured as a 50% by weight xylene solution at 20° C., the quantity of paraformaldehyde added will be smaller, for instance 0.01 to 0.08% by weight. It is best if the amount added is between 0.01 and 0.04% by weight.

If the copolymers have lower viscosities, for instance 50 to 500 DIN 6 seconds when measured as a 50% by weight xylene solution at 20° C., the proportion of paraformaldehyde will amount to between 0.03 and 0.2% by weight. In this case it is best if the amount added is between 0.04 and 0.1% by weight.

If hexamethylenetetramine is used instead of paraformaldehyde, the substance is introduced in the same manner as when paraformaldehyde is used. If the initial viscosity of the copolymers amounts for instance to between 500 and 1000 DIN 6 seconds when measured as a 50% by weight xylene solution at 20° C., then in this case, when hexamethylenetetramine is used, a quantity of hexamethylenetetramine amounting to between 0.02 and 0.2% by weight, preferably 0.03 to 0.1% by weight, can be used.

If the copolymers have lower viscosities, for instance 50 to 500 DIN 6 seconds when measured as a 50% by weight xylene solution at 20° C., then preferably 0.06 to 0.5% by weight is used when hexamethylenetetramine is employed.

It is also possible to otbain satisfactory results by using trioxane, and gaseous formaldehyde dissolved or dispersed in any one of many different media such as water, solvents, plasticizers, vegetable or mineral oils or synthetic or natural resins. But paraformaldehyde and hexamethylenetetramine are preferably used. The addition of trioxane is not part of the preferred embodiment.

The copolymers made in accordance with the invention are used as fusion contact adhesives and have a high chemical stability, so that at the relevant working temperatures of about 200° C. they can be worked during a period of 12 to 48 hours without great changes in viscosity. These fusion contact adhesives also have an advantageous dependency of their viscosity on temperatures, that is to say, as the temperature rises their viscosity decreases so rapidly that the liquid melts can be satisfactorily worked and do not become ropy.

In the special embodiment the reaction of formaldehyde or formaldehyde-donating substances with the copolymers containing amide groups gives rise to a condensation which slightly increases the viscosity but at temperatures up to 200° C. still produces liquid and meltable fusion contact adhesives which when applied to any one of many different materials provide very good cohesion at room temperature and also at temperatures from 50 to 100° C.

When applied to the materials to be cemented, the copolymers used as fusion contact adhesives according to the invention produce firmly adherent films which may be sticky or not sticky at room temperature.

Films which are capable of cementing at room temperature are preferred to a self-adhesive fusion contact adhesives.

Fusion contact adhesives which do not produce sufficient surface stickiness of the films at room temperature must be activated by an increase in temperature.

The most preferred embodiment is the film with good surface stickiness which cements even at room temperature.

When used as fusion contact adhesives the copolymers made in accordance with the invention have a good power of adhesion to ordinary materials such as wood, leather, paper, metal, glass, lacquered metal surface, textiles and plastic sheets. The addition of ester plasticizers has an advantageous effect for cementing operations at temperatures of 0 to +10° C. The incorporation of fillers and extenders such as barium sulphate, chalk and quartz powder in quantities up to 50% by weight does not have any effect in reducing the strenght of the cemented joint.

In a special and particularly preferred embodiment the fusion contact adhesive is applied while hot to an adhesive carrier which is to be cemented. The cementing operation is subsequently carried out in the cold state; in this operation the object to be cemented is pressed on to the adhesive carrier, whereupon cementing takes place.

It has now been found that a practicable method of cementing in accordance with the above mentioned manner of operation is arrived at if a modification of the method is carried out which is characterized in that the formaldehyde-releasing compound and the copolymer are applied together or successively to a carrier and the product of the reaction between the copolymer and the formaldehyde-releasing compound is formed by keeping the material at the melting temperature of the copolymer and/or by subsequent heating.

The modification of the method characterized as described above can be carried into effect by a process in which a carrier, for instance a material to be cemented, is first coated, impregnated or pretreated with a formaldehyde-releasing compound by spraying, powdering or vapor deposition or in some other suitable way, and subsequently the copolymer is applied in a molten state, or alternately the copolymer is first applied and subsequently the applied copolymer is provided with a formaldehyde-releasing compound. It is also possible to apply the copolymer and the formaldehyde-releasing compound together or alternately to at least one of the surfaces to be cemented.

In a further particular embodiment of the method the formaldehyde-releasing compound can also be applied as an intermediate layer, in which case the base layer previously laid on the carrier material may consist either of the copolymer to be cross-linked or also of any other suitable and compatible binding agent. The covering layer consists in each case of the copolymer which is to be made to react with the formaldehyde-releasing compound, in order to form the fusion contact adhesive before cementing takes place.

This modified manner of operation has the great advantage that the copolymer when applied is not yet chemically combined with the formaldehyde-releasing compound, so that the conventional applying apparatus with the hitherto used nozzles, rollers and other applying devices can be employed, since the viscosity of the copolymer at its melting temperature is relatively low as compared with that of the fusion contact adhesive formed by reaction of the copolymer with the formaldehyde-releasing compound. A further advantage is that the reaction of the copolymer with the formaldehyde-releasing compound to form the fusion contact adhesive can be effected in an extremely short time, because the formaldehyde-releasing compound can now be used in such large quantities as to ensure that for instance 0.01 to 1.0% by weight of the formaldehyde-releasing compound really enters into the reaction with the copolymer that is used. The excess formaldehyde-releasing compound that has not entered into the reaction evaporates or gasifies and can easily be removed by suitable suction devices so that the cemented joint or the fusion contact adhesive in the cemented state is practically free from contamination by superfluous formaldehyde-releasing compounds that are not chemically combined with it. This modification enables even fusion contact adhesives which are such that they have a substantially higher viscosity and can be applied only with difficulty, or cannot be applied at all, by means of the usual applying apparatus, to be produced after application of the material, to the surface to be cemented.

The melt viscosities of the polymeric fusion adhesives produced in the following examples were determined in a viscosimeter of the type Epprecht-Rheomat 15.

The shear strength was determined in accordance with DIN (German Industrial Standard) 53273; the material used was a polyester sheet based on terephthalic acid (Kalle Hostafan sheet), which was 5 cm. wide and 0.1 mm. thick. The overlap amounted to 5 mm. The separating strength was determined in accordance with DIN 53274; in this case also, polyester sheet based on terephthalic acid (Hostafan sheet) was used, which was 0.1 mm. thick and 5 cm. wide.

The molten adhesive was applied to the sheet by an applicator producing a film thickness of 150μ and then cemented.

The heat resistance was determined as follows:

Bituminous felt containing 50% of bitumen by weight was coated with the fusion adhesive while hot. The coated side of a strip of this felt which was 5 cm. wide and 15 cm. long was cemented at room temperature of a metal plate, so that a cemented surface area of 50 cm.$^2$ was obtained. After having been stored for 24 hours at room temperature the cemented joint was tempered at 70° C. for 5 minutes, and a 50 g. weight of which the force acted at 90° to the joint was used to determine the time in which the cemented strip was separated from the metal plate at 70° C. (see drawing).

A notation from "Tack" 1 to "Tack" 10 has been selected for evaluation or surface stickiness.

Tack 1 = does not stick at room temperature
Tack 2 to 6 = insufficient surface stickiness at room temperature Tack 7=sufficient surface stickiness at room temperature Tack 8=satisfactory surface stickiness at room temperature Tack 9=good surface stickiness at room temperature Tack 10=very good surface stickiness at room temperature.

Set forth below are several specific examples of the invention. These examples, being illustrative, are not to be construed as limiting. All parts and percentages are by weight unless otherwise specified.

Example 1

Manufacture of Copolymer 1

In a three-necked flask provided with a stirrer and a thermometer, a mixture of 250 parts by weight of toluene,
50 parts by weight of isobutanol,
40 parts by weight of acrylamide,
540 parts by weight of 2-ethyl hexylacrylate,
40 parts by weight of acrylonitrile and
40 parts by weight of methyl methacrylate is heated to boiling point under reflux and a mixture of 50 parts by weight of toluene and
4 parts by weight of di-tertiary butyl peroxide is added in one hour and the material is polymerized under reflux for another 6 to 8 hours. After the solids content of the solution has reached about 65% by weight, the solvent mixture is distilled off in a vacuum up to 200° C. A 50% by weight xylene solution of the resin has a viscosity of 450 DIN 6 seconds at 20° C.

The use of copolymer 1 as a fusion contact adhesive: Two PVC sheets 0.1 mm. thick became mechanically coated with the molten copolymer 1 at the areas to be cemented with a thickness of a layer of ca. 80$\mu$ while the PVC sheets are cooled at the bottom.

After cooling of the applied copolymer 1 the sheets will be cemented by pressing the coated faces one upon another at room temperature.

Tests of the cementing were made after storage for 24 hours.

Shear strength: 4.5 Kp./cm.$^2$
Separating strength: 0.9 Kp./cm.
Heat resistance at 70° C.: 7. minutes
Heat test: viscosity measured at 20° C.
Fusion contact adhesive after storage for 24 hours at 180° C.: 300 DIN 6 seconds when measured as a 50% by weight xylene solution Fusion contact adhesive after storage at room temperature: 250 DIN 6 seconds when measured as a 50% by weight toluene solution
Surface stickiness at 20° C.: "Tack" 10

99.5 parts by weight of copolymer 1 were mixed with 0.5 parts by weight of a customary antioxidant at 180° C. The obtained fusion contact adhesive was applied in the molten state by an applicator to the bottom of a textile floor covering in a thickness of film of 300$\mu$ at about 180° C. Silicone paper was put upon the still warm fusion contact adhesive layer for covering.

The silicone paper was taken off at the place of consumption at room temperature (20° C.). After that the floor covering coated with fusion contact adhesive was being pressed by hand against a concrete floor. The cementing is then finished. The strength of the cementing corresponds with the above described test results.

EXAMPLE 2

Manufacture of Copolymer 2

As described in Example 1, a mixture consisting of
300 parts by weight of toluene,
50 parts by weight of isobutanol,
60 parts by weight of acrylonitile,
40 parts by weight of acrylamide,
20 parts by weight of methyl methacrylate,
560 parts by weight of 2-ethyl hexylacrylate and
5 parts by weight of di-tertiary butyl peroxide is heated to boiling point and copolymerized for 6 to 8 hours under reflux and the solvent mixture is distilled off. A 50% by weight xylene soulton of the resin had a viscosity of about 200 DIN 6 seconds at 20° C.

The use of copolymer 2 as a fusion contact adhesive:
Two PVC sheets 0.1 mm. thick were coated by means of the copolymer 2 as described in Example 1 and cemented together at room temperature.

Tests of the shear and separating strength of the cementing were made after storage for 24 hours.

Shear strength: 5 Kp./cm.$^2$
Separating strength: 0.8 Kp./cm.
Heat resistance at 70° C.: 11 minutes.

9.5 parts by weight of copolymer 2 and 0.5 parts by weight of the customary antioxidant on the basis of phenol were mixed at a temperature of about 180° C. The obtained fusion contact adhesive was applied in the molten state at 180° C. by an applicator in a layer 200$\mu$ thick to bituminous felt containing 50% by weight of bitumen. Silicone paper was put on the still warm layer of fusion contact adhesive for covering. At the place of consumption the silicone paper was pulled off. Then the bituminous felt covered with fusion contact adhesive was cemented by hand on the inside of a car door made of sheet metal that had been coated with a primer in the usual manner. The cementing is then finished. The strength of the cementing corresponds with the above-mentioned test results.

EXAMPLE 3

Manufacture of Copolymer 3

As described in Example 1, a mixture consisting of 250 parts by weight of toluene,
50 parts by weight of isobutanol,
20 parts by weight of acrylamide,
95 parts by weight of methyl methacrylate,
35 parts by weight of acrylonitrile and
500 parts by weight of 2-ethyl hexylacrylate is heated to boiling point and the following mixture of
50 parts by weight of toluene and
4 parts by weight of di-tertiary butyl peroxide is added and the material is polymerized for 6 to 8 hours. After the solvent mixture is distilled off a 100% resin is obtained. A 50% by weight solution of the resin in xylene has a viscosity of 300 DIN 6 seconds at 20° C.

Use of copolymer 3 as a fusion contact adhesive:
Two PVC sheets 0.1 mm. thick were cemented together by means of the copolymer 3 at room temperature as described above.

Tests of the shear and separating strength were made after storage for 24 hours.

Shear strength: 4 Kp./cm.$^2$
Separating strength: 0.9 Kp./cm.
Heat resistance at 79° C.: 8 minutes
Heat test: viscosity measured at 20° C.
Fusion contact adhesive after storage for 24 hours at 180° C.: 300 DIN 6 seconds when measured as a 50% by weight xylene solution Fusion contact adhesive that had been exposed to room temperature only: 250 DIN 6 seconds when measured as a 50% by weight xylene solution Surface stickiness at 20° C.: "Tack" 10

| Temperature, °C. | Initial viscosity, cp. | Viscosity after storage for 48 hours at 180° C., cp. |
|---|---|---|
| Viscous flow behavior in dependency on temperature | | |
| 200 | 3,000 | 4,600 |
| 180 | 4,100 | 7,000 |
| 160 | 9,100 | 12,400 |
| 140 | 16,500 | 21,500 |
| 120 | 54,200 | 70,700 |

The fusion contact adhesive did in fact show a rise in viscosity after having been stored for 48 hours at 180° C., but this product could still be worked very satisfactorily.

99.5 parts by weight of copolymer 3 and 0.5 parts by weight of customary antioxidant made on the basis of phenol were mixed at a temperature of about 180° C. The obtained fusion contact adhesive was applied in the molten state at 180° C. by an applicator in a layer 80μ thick to a strong soda paper being plain on both sides. The strong soda paper has been coated in the usual manner on the side free of fusion contact adhesive with an anti-adhesive layer made on the basis of silicone resin. Afterwards the covered strong soda paper was rolled up to a roll. At the place of consumption the roll was uncoiled, and the tape having the fusion contact adhesive layer was pressed by hand against the surface that had to be covered up. The cementing is then finished. The strength of the cementing corresponds with the above-mentioned test results.

EXAMPLE 4

Reaction of Copolymer 3 with paraformaldehyde 100 parts by weight of the copolymer 3, to which 0.04 part by weight of paraformaldehyde has been added, are used as a fusion contact adhesive. This added material was introduced into the copolymer while it was being stirred at 100 to 120° C., and the mixture was kept at 160° C. to 180° C. for another 30 to 60 minutes.

Use of the reaction product of Example 4 as a fusion contact adhesive:

Two PVC sheets 0.1 mm. thick were coated as described above and cemented at room temperature.

The tests of the shear and separating strength were carried out after storage for 24 hours at room temperature.

Shear strength: 6.5 Kp./cm.$^2$
Separating strength: 1.5 Kp./cm.
Heat resistance at 70° C.: 14 minutes
Heat test: viscosity measured at 200° C.
Fusion contact adhesive that had been exposed to 180° C. for only a short time: 5100 cp.
Fusion contact adhesive after storage for 48 hours at 180° C.: 7200 cp.

This fusion contact adhesive did in fact show a rise in viscosity after having been stored for 48 hours at 180° C., but this product could still be worked very satisfactorily.

Surface stickiness at 20° C.: "Jack" 9

| Temperature, °C. | Initial viscosity, cp. | Viscosity after storage for 48 hours at 180° C., cp |
|---|---|---|
| Viscous flow behavior in dependency on temperature | | |
| 200 | 5,000 | 7,200 |
| 180 | 7,400 | 12,100 |
| 160 | 16,000 | 22,200 |
| 140 | 35,000 | 45,500 |
| 120 | 102,000 | 133,000 |

99.5 parts by weight of fusion contact adhesive according to Example 4 and 0.5 parts by weight of the usual antioxidant were mixed at 180° C. The obtained fusion contact adhesive was applied in the molten state at a temperature of about 180° C. by an applicator with a thickness of layer of about 250μ to the even surface of a molded fibre board. The obtained fusion contact adhesive layer was covered with silicone paper until further processing was done. At the place of consumption the silicone paper was pulled off, and a colored decorative sheet was pressed at room temperature (20° C.) upon the fusion contact adhesive. The cementing was then finished and the strength corresponds with the above-mentioned test results.

EXAMPLE 5

Reaction of Copolymer 3 with hexamethylenetetramine 100 parts by weight of the copolymer 3, to which 0.08 part by weight of hexamethylenetetramine has been added, are used as a fusion contact adhesive.

This added material was introduced into the copolymer 3, while it was being stirred at 100 to 120° C., and the mixture 3 was kept at 160° C. to 180° C. for another 30 to 60 minutes.

Use of the reaction product obtained in accordance with Example 5 as a fusion contact adhesive:

Two PVC sheets 0.1 mm. thick are cemented together at room temperature as described above. The tests of the shear and separating strength were made after storage for 24 hours at room temperature.

Shear strength: 6.8 Kp./cm.$^2$
Separating strength: 1.1 Kp./cm.
Heat resistance at 70° C.: 28 minutes
Heat test: viscosity measured at 200° C.
Fusion contact adhesive after storage for 48 hours at 180° C.: 17500 cp.
Fusion contact adhesive that had been heated to 180° C. for only a short time: 12000 cp.

The fusion contact adhesive did in fact show a rise in viscosity after having been stored for 48 hours at 180° C., but the product can still be worked very satisfactorily.

| Temperature, °C. | Initial viscosity, cp. | Viscosity after storage for 48 hours at 180° C., cp. |
|---|---|---|
| Viscous flow behavior in dependency on temperature | | |
| 200 | 12,000 | 17,800 |
| 180 | 16,900 | 22,500 |
| 160 | 29,600 | 35,500 |
| 140 | 66,900 | 78,000 |
| 120 | 138,000 | 160,000 |

99.5 parts by weight of fusion contact adhesive according to Example 5 and 0.5 parts by weight of the usual antioxidant were mixed at 180° C. The obtained fusion contact adhesive was applied at a temperature of about 180° C. by an applicator with a thickness of about 150μ to silicone paper. A non-woven fabric (fibre made of polypropylene) being 6 mm. strong was put on the obtained fusion contact adhesive layer. Afterwards the coated silicone paper with the applied non-woven fabric was fed through an auxiliary roller by which the fusion contact adhesive was transferred from the silicone paper to the non-woven fabric. At the place of consumption the silicone paper was pulled off and the non-woven fabric having the fusion contact adhesive layer was cemented at room temperature (20° C.) to a sheet of aluminum. The cementing was then finished and the strength corresponds with the above-mentioned test results.

EXAMPLE 6

A copolymer 3 is applied in the molten state to a carrier material, for instance bituminous felt, and after application is uniformly coated by powdering with pulverulent paraformaldehyde. In this example the sprinkled surface is blown with compressed air to remove excess paraformaldehyde so that 4% by weight of formaldehyde, with respect to the weight of the applied copolymer, is left on the surface. A reaction is then produced by heating to between 140 and 180° C. (preferably 180° C.) for a period of about 5 minutes, whereby 0.8% by weight formaldehyde had been introduced. The reaction product obtained is a fusion contact adhesive layer having a substantially higher heat resistance and shear strength in the cemented joint than the initial copolymer.

The fusion contact adhesive side of the bituminous felt coated on one side with the fusion contact adhesive, is covered with a pull-off sheet, for instance suitably impregnated paper or suitable plastic sheet. The ultimate user removes the cover located on the fusion contact adhesive side and brings the part to be cemented, for instance sheet metal forming part of automobile coachwork, into contact with the fusion contact adhesive side and presses the bituminous felt against the metal whereupon the felt adheres firmly to the metal.

EXAMPLE 7

The carrier material, for instance bituminous felt, is sprinkled with paraformaldehyde in the way described in Example 6 and then the copolymer 3 is applied by spreading, rolling or pouring at a temperature of about 180° C. A reaction with the paraformaldehyde sprinkled on as the base layer is then produced by keeping the melting temperature at about 180° C. for a period of 5 minutes and/or by subsequent heating to a temperature of 140 to 180° C. (preferably 180° C.) for 5 minutes. The resulting fusion contact adhesive containing 0.9% by weight reacted formaldehyde has a substantially higher heat resistance and shear strength than the initial copolymer. The rest of the processing can be carried out as described in Example 6.

EXAMPLE 8

The carrier material, for instance bituminous felt, is provided with a base layer consisting of a copolymer of vinyl acetate and fumaric acid butyl ester and paraformaldehyde is sprinkled on this base layer. The sprinkled surface is blown with compressed air so that about 4% by weight of paraformaldehyde, with respect to the weight of the applied fusion adhesive copolymer, remains on the surface.

The copolymer 3 is then applied at 180° C. in a layer about 200μ thick and the reaction with the paraformaldehyde that has already been previously applied is carried out for 5 minutes at 180° C. and will then react with 0.95% by weight of formaldehyde. The result is a substantial increase in the heat resistance and shear strength in the subsequent cemented joint. Processing as described in Example 6 can be carried out.

EXAMPLE 9

The carrier material, for instance bituminous felt, is provided with a base layer consisting of another copolymer of 80% by weight of vinyl acetate and 20% by weight of 2-ethyl hexylacrylate.

A solution of 8% by weight of hexamethylenetetramine in chloroform is sprayed on to this base layer so as to form a thin layer and after this has dried the copolymer 3 is applied in a layer 200μ thick at a temperature of 180° C. The reaction with hexamethylenetetramine as a formaldehyde-releasing agent is then carried out for 5 minutes at 180° C., whereby 0.95% by weight of formaldehyde is made to react.

It was found that in cemented joints the heat resistance was increased sixfold, from 5 minutes to 30 minutes. The heat resistance was determined by the test described above. Further processing as described in Example 6 can be carried out.

Comparison Tests to Prove the Advance Over the Art

Test 1

From copolymers prepared according to instructions given in U.S. Pat. 3,362,844 to Christenson (Amide interpolymer A, B, C, D, E, F and G) glass plates have been coated and the tackiness has been estimated at room temperature and at 50° C. of each of the coated plates after the solvents present were evaporated.

Test 2

From copolymers prepared according to instructions given in Examples 1, 2 and 3 of U.S. Pat. 3,366,605 to Seiner glass plates have been coated and the tackiness has been estimated in the same manner as described in Test 1.

The following table shows the results of the foregoing comparison tests 1 and 2 in "Tack" values.

| Test 1 | | | Test 2 | | |
|---|---|---|---|---|---|
| | Tack values | | | Tack values | |
| Copolymer | RT | 50° C. | Example | RT | 50° C. |
| A | 1 | 2 | 1 | 1 | 2 |
| B | 4 | 5 | 2 | 2 | 3 |
| C | 1 | 2 | 3 | 3 | 4 |
| D | 1 | 2 | | | |
| E | 1 | 2 | | | |
| F | 1 | 1 | | | |
| G | 1 | 1 | | | |

The copolymers prepared according to Christenson and Seiner can by no means be called self-adhesive copolymers, because the adhesive properties of these copolymers are not sufficient for cementing solid materials.

In the drawing,

FIG. 1 shows a bottom view of a test device for the determination of heat resistance, and FIG. 2 shows a side elevation of the test device with a test weight attached.

Test device 10 shown in FIGS. 1 and 2 comprises metal plate 11 to which is affixed a portion of bituminous felt strip 12 by means of the fusion adhesive to be tested. Weight 14 is attached to free end 13 of strip 12 as shown in FIG. 2.

It will be obvious to those skilled in the art that other changes and variations can be made in carrying out the present invention without departing from the spirit and scope thereof as defined in the appended claims.

What is claimed is:

1. A method for making a polymeric fusion adhesive practically free of organic solvents and which is meltable and soluble in organic solvents and the liquid melt of which can be worked satisfactorily, which consisting essentially of
    (1) heating a mixture of
        (a) 1 to 20% by weight of acrylonitrile,
        (b) 1 to 20% by weight of acrylamide,
        (c) 40 to 97% by weight of 2-ethylhexylacrylate,
        (d) 1 to 30% by weight of methyl methacrylate in an organic solvent to a temperature of about 100° C. to 140° C.;
    (2) adding a polymerization initiator to said heated mixture, and
    (3) removing organic solvent from said mixture after samples of the resulting polymeric mixture indicate that the polymer has the viscosity of 100 to 600 DIN 6 seconds measured at 20° C. as 50% strength by weight in xylene solution and showing good adhesive properties in the temperature range of 0° to 50° C.

2. A method according to Claim 1, characterized in that the polymeric fusion adhesive is made to react with 0.01 to 0.5% by weight of formaldehyde or formaldehyde-donating compounds while being heated.

3. A method according to Claim 1, characterized in that the polymeric fusion adhesive is made to react with more than 0.5 to 1.0% by weight of formaldehyde or formaldehyde-donating compounds while being heated.

4. A method according to Claim 1, wherein xylene, butanol or toluene is used as organic solvent.

5. A method according to Claim 1 wherein di-tertiary butyl peroxide is used as the polymerization initiator.

6. A fusion adhesive practically free of organic solvents and comprising an interpolymer consisting essentially of
    (a) 1 to 20% by weight of acrylonitrile, (b) 1 to 20% by weight of acrylamide,
(c) 40 to 97% by weight of 2-ethylhexylacrylate, and
(d) 1 to 30% by weight of methyl methacrylate, said interpolymer having a viscosity of from about 100 to about 600 DIN 6 seconds measured at 20° C. as 50% strength by weight xylene solution and showing good adhesive properties in the temperature range of 0° to 50° C.

7. The fusion adhesive as described in Claim 6, wherein said interpolymer contains about 0.01 to 0.5 percent by weight of reacted formaldehyde or formaldehyde-donating compounds.

8. A fusion adhesive as defined in Claim 6, wherein the interpolymer contains additionally between 0.5 and 1% by weight of reacted formaldehyde or formaldehyde-donating compounds.

References Cited

UNITED STATES PATENTS

| | | | |
|---|---|---|---|
| 3,366,605 | 1/1968 | Seiner | 260—72 |
| 3,362,844 | 1/1968 | Christenson et al. | 117—75 |
| 3,299,010 | 1/1967 | Samour | 260—78 |
| 3,535,293 | 10/1970 | Anderson | 260—78.5 |
| 3,230,275 | 1/1966 | Sekmakas | 260—873 |

JOSEPH L. SCHOFER, Primary Examiner

JOHN KIGHT, Assistant Examiner

U.S. Cl. X.R.

156—327; 260—72 R, 78 UA, SC, 78.5 R, N, E, 80.81, 80.73

UNITED STATES PATENT OFFICE
CERTIFICATE OF CORRECTION

Patent No. 3,842,133      Dated October 15, 1974

Inventor(s) H. Dalibor et al.

It is certified that error appears in the above-identified patent and that said Letters Patent are hereby corrected as shown below:

Col. 4, line 8     "in"
                    should read -- is --.

Col. 5, line 1     "otbain"
                    should read -- obtain --.

Col. 8, line 7     "soulton"
                    should read -- solution --.

Col. 8, line 19     "9.5 parts by weight"
                    should read -- 99.5 parts by weight --.

Col. 9, line 61     "Jack"
                    should read -- Tack --.

Signed and sealed this 7th day of January 1975.

(SEAL)
Attest:

McCOY M. GIBSON JR.            C. MARSHALL DANN
Attesting Officer                Commissioner of Patents